(12) United States Patent
Murphy

(10) Patent No.: US 7,484,438 B2
(45) Date of Patent: Feb. 3, 2009

(54) RIGHT ANGLE DRIVING TOOL

(76) Inventor: Robert Murphy, 2 Canby Chase, Media, PA (US) 19063

( * ) Notice: Subject to any disclaimer, the term of this patent is extended or adjusted under 35 U.S.C. 154(b) by 0 days.

(21) Appl. No.: 11/637,323

(22) Filed: Dec. 12, 2006

(65) Prior Publication Data
US 2008/0135271 A1   Jun. 12, 2008

(51) Int. Cl.
  *B25B 17/00* (2006.01)
(52) U.S. Cl. ..................... 81/57.29; 81/57.13
(58) Field of Classification Search .............. 81/57.29, 81/57.12–57.14, 57.46, 57.3, 57.31, 57.28, 81/177.1, 177.2
See application file for complete search history.

(56) References Cited
U.S. PATENT DOCUMENTS

| | | | | |
|---|---|---|---|---|
| 685,544 | A * | 10/1901 | Weimar | 81/57.29 |
| 3,430,510 | A * | 3/1969 | Hendrickson | 74/425 |
| 3,630,106 | A * | 12/1971 | Olinger | 81/57.29 |
| 4,899,415 | A * | 2/1990 | Wheeler | 81/177.1 |
| 5,345,845 | A * | 9/1994 | Myers | 81/57.29 |
| 6,536,310 | B2 * | 3/2003 | Goldfein | 81/57.29 |
| 6,651,532 | B1 * | 11/2003 | Whitelock et al. | 81/57.29 |
| 2007/0125203 | A1 * | 6/2007 | Nguyen | 81/57.29 |

* cited by examiner

*Primary Examiner*—D. S Meislin
(74) *Attorney, Agent, or Firm*—Massinger Law Offices

(57) ABSTRACT

A right angle driving apparatus capable of operable attachment to a powered rotational drive device such as a drill, the driving apparatus being generally comprised of a worm gear drive encased within a unique block-shaped housing. The subject driving apparatus may be employed to transmit power at high velocity ratios between a shaft that is driven by the drill to a wheel having an axis of rotation perpendicular to that of the shaft. The worm gear drive may be used as a speed increaser but is preferably used as a speed reducer in which the worm is the driver and the wheel is the driven member. The worm wheel is slidably mounted on a cylindrical hub adapted to receive in either end a variety of driving tools such as sockets and screwdriver blades used to rotate fasteners. The worm wheel is driven by a worm attached to a drive shaft the journaled end of which may be adapted to receive driving tools as well to permit direct driving of tools in addition to right angle driving.

2 Claims, 3 Drawing Sheets

RIGHT ANGLE DRIVING TOOL

FIELD OF THE INVENTION

The subject invention relates to drill attachments generally, and to a right angle driving attachment for drills in particular.

BACKGROUND OF THE INVENTION

The difficulties associated with the use of hand tools and power tools in confined or otherwise difficult to reach work spaces are well known in many industries. Performance of repairs and maintenance on automobiles, for instance, often involves the need for the removal or attachment of threaded fasteners such as nuts, bolts and screws which are located in confined areas, at difficult angles or distances to reach, and which cannot be accessed by many tools. As a consequence, these threaded fasteners must often be rotated with open end wrenches providing only a slow manual manipulation of the fastener using a series of back and forth hand movements to accomplish incremental moments of travel. Such practices are labor intensive and afford little or no means for limiting the torque delivered to the fastener. In some circumstances, the fastener may be located in areas which are out of reach by even elongated ratcheted wrenches or at distances that make use of the wrench impracticable because there is insufficient room to accommodate the distance that the wrench handle must travel to accomplish even a small degree of rotation of the fastener. This occurs because the distance that the handle of the wrench must travel along the arc of rotation increases in proportion to the length of the tool (i.e., the distance of the handle from the working end of the tool).

There have been a number of hand tools designed for angled work and for work in confined spaces generally. One such device is disclosed in U.S. Pat. No. 4,474,089 issued to Scott and is comprised of a driver for socket wrenches or similar tools constructed to effect rotation of the wrench by rotary wrist action. Manual rotation of a grip is transmitted through shafts and gears to the tool lug and a ratchet mechanism is provided to permit the selective transmission of torque to the tool in either direction of grip rotation. The Scott device does suffer from various limitations and shortcomings not the least of which are its inability to integrate with a rotational drive device such as a powered drill as well as its unsuitability for work in confined spaces.

Additionally, various forms of speed ratchet handles and ratchet wrench speeders, have been provided to address the limitations of conventional socket and ratchet wrenches. Speed ratchet handles and ratchet wrench speeders of the prior art are often expensive to manufacture and do not permit attachment or adaptation to existing socket, ratchet, or torque wrenches.

U.S. Design Pat. No. D415,664 issued to Rapoport teaches a hand held speeder tool and rotary device designed to fit into confined areas. The Rapoport device utilizes a built-in pull cord in combination with a rotary disc assembly to transfer rotational torque to an output shaft which may be coupled with various forms of sockets and removable screwdriver blades to rapidly rotate against light torque loads (e.g. fasteners). While the unique design of the tool makes it useful in confined work spaces, because the axis of rotation extends directly from the user's hand the tool may only be used in areas which are within arm's reach of the user. Moreover, the tool is not intended to be used in combination with a powered rotational drive device such as a drill, but rather must be manually operated at all times.

In view of the requirement of working with fasteners at confining and remote locations, and still further considering the desire to utilize a powered rotational drive device while doing so, it is apparent that a need exists for a drill attachment capable of reaching threaded fasteners in relatively tight working areas, in areas where the drill itself cannot fit and at angles perpendicular to the axis-of-rotation of the drill.

SUMMARY OF THE INVENTION

The subject invention more specifically relates to a right angle driving apparatus capable of operable attachment to a powered rotational drive device such as a drill, the driving apparatus being generally comprised of a worm gear drive encased within a unique block-shaped housing as more fully described in detail herein. The subject driving apparatus may be employed to transmit power at high velocity ratios between a shaft which is driven by the drill to a wheel having an axis of rotation perpendicular to that of the shaft. The worm gear drive may be used as a speed increaser but is preferably used as a speed reducer in which the worm is the driver and the wheel is the driven member. The worm wheel is slidably mounted on a cylindrical hub adapted to receive in either end a variety of driving tools such as sockets and screwdriver blades used to rotate fasteners. The worm wheel is driven by a worm which is alternately fastened to, or permanently integrated with, an elongated drive shaft the journaled end of which may be adapted to receive driving tools as well to permit direct driving of tools in addition to right angle driving. A notable feature of the subject right angle driving apparatus is the absence of any parts, whether operable or static, which extend beyond the planar surfaces of the housing.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is, therefore, a primary object of the subject invention to provide a driving apparatus capable of operable attachment to a powered rotational drive device such as a drill and further capable of driving threaded fasteners: a) in relatively tight working areas, b) in areas where a drill itself cannot fit, and c) both axially and at angles perpendicular to the axis-of-rotation of the drill.

It is another primary object of the subject invention to provide a right angle driving apparatus which utilizes a worm gear drive to transmit power at high velocity ratios between a shaft which is driven by a drill to a wheel having an axis of rotation perpendicular to that of the shaft.

Another object of the subject invention is to provide a right angle driving apparatus which may be used as a speed increaser or as a speed reducer in which the worm is the driver and the wheel is the driven member.

Still another object of the subject invention is to provide a right angle driving apparatus capable of cooperative union with a variety of conventional driving tools such as screw drivers, nut drivers and the like having shafts which are polygonal in cross section.

Yet another object of the subject invention is to provide a right angle driving apparatus capable of rotating a driving tool in either a clockwise or counter clockwise direction without changing the direction of travel of the drill shaft itself.

It is also an object of the subject invention to provide a right angle driving apparatus wherein all parts, both static and operable, are secured within a protective housing.

Another object of the subject invention is to provide a right angle driving apparatus which is relatively simple in design and therefore capable of rapid construction at relatively low costs.

These together with other objects of the invention, along with the various features of novelty which characterize the invention, are pointed out with particularity in the claims annexed to and forming a part of this disclosure. For a better understanding of the invention, its advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
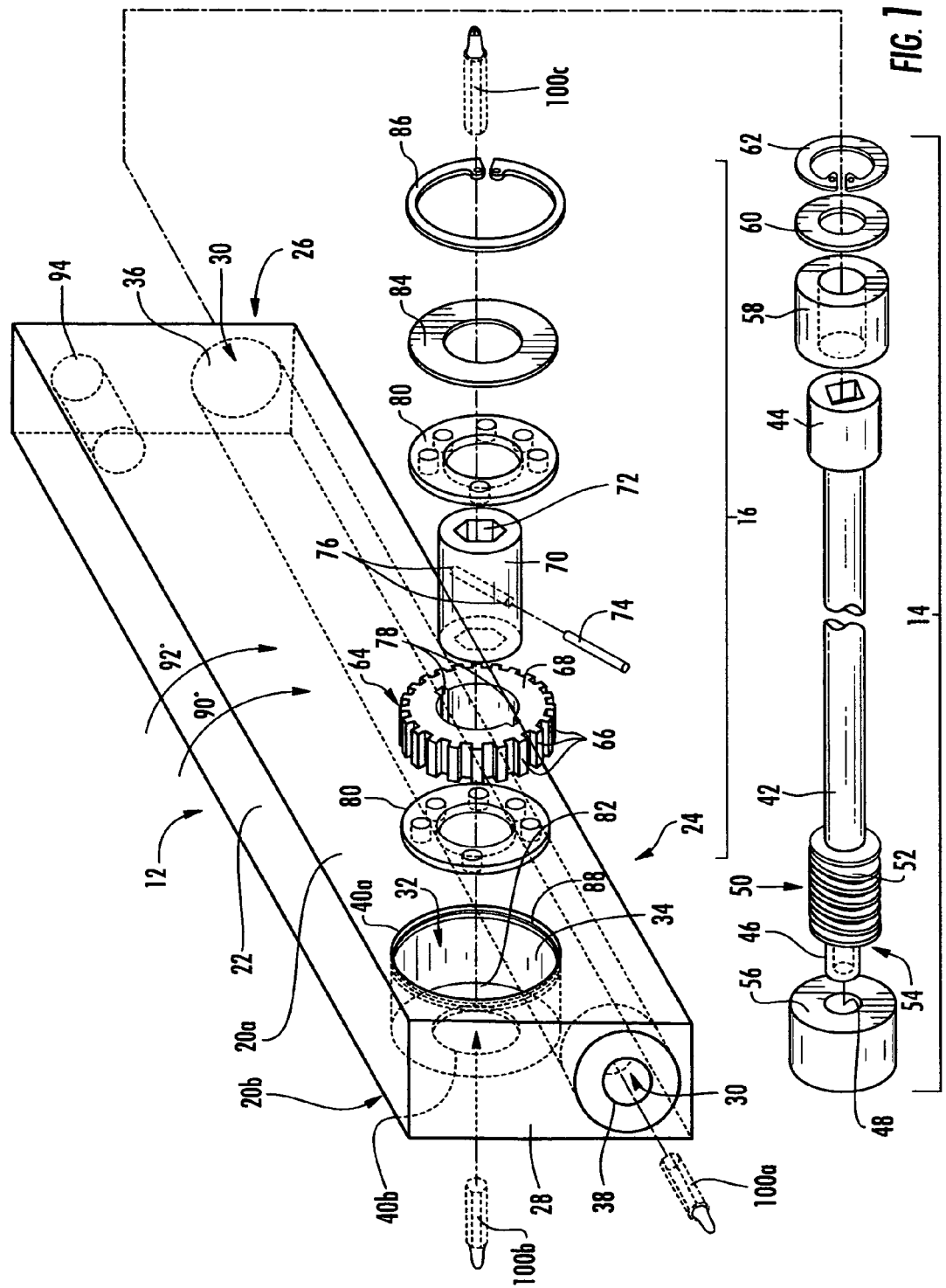
FIG. 1 is an exploded view of the subject right angle driving apparatus, portions of which are depicted in phantom view.

Reference is now made to FIG. 1 in which there is illustrated in exploded view the subject right angle driving apparatus (hereinafter sometimes also referred to as simply "driving apparatus"), designated generally by reference numeral 10. The subject invention is comprised of three primary components, namely housing 12, drive shaft assembly 14, and worm wheel assembly 16, each of which are more fully described below in seriatim.

In a preferred embodiment, housing 12 is an elongated block-shaped structure having a predominantly solid core 18, first exterior side wall 20a, second exterior side wall 20b, top 22, bottom 24, proximal end 26, and distal end 28. Housing 12 may be fabricated using a variety of conventional methods such as casting, injection molding or machining and using a variety of materials including aluminum, alloys, or thermoplastic or thermosetting polymers ("plastics"). All edges may be beveled (not shown) for ease of handling during use. In other embodiments, housing 12 may be manufactured to produce alternate external shapes, although the block-shape illustrated has certain mechanical advantages which will become apparent upon reference to the method of use description, infra.

Housing 12 includes an elongated axial bore 30 extending, in a preferred embodiment, through core 18 from proximal aperture 36 of proximal end 26 to distal aperture 38 of distal end 28. In an alternate embodiment, bore 30 terminates behind proximal end 26; no proximal aperture is present. Transverse bore 32 is situated both dorsally and perpendicular to axial bore 30, and extends from $1^{st}$ side aperture 40a through core 18 of housing 12 to $2^{nd}$ side aperture 40b. Note that a ventral portion of transverse bore 32 intersects with a dorsal portion of axial bore 30 forming communication portal 34. The chambers defined by axial bore 30 and transverse bore 32 are therefore joined, permitting operable communication between drive shaft assembly 14 and worm wheel assembly 16 housed therein, respectively (FIG. 2).

Drive shaft assembly 14 is comprised of an elongate shaft 42 terminating at its proximal end in lug adaptor 44 and at its distal end in shaft journal 46. Shaft 42 may be of an infinite number of lengths although in preferred embodiments, the combined length of adaptor 44, shaft 42 and journal 46 is no greater than that of housing 12, such that they are completely encased therein. Adaptor 44 serves as a means for detachably engaging the driving member of a powered rotational drive device such as a drill (not shown). Journal 46 may be optionally adapted with driving tool attachment means 48 comprised of an open-ended chamber, polygonal in cross-section, and having a depth sufficient to securely receive similarly shaped shafts of driving tools. Thusly equipped, the subject driving apparatus 10 is capable of directly driving threaded fasteners in an axial direction when shaft 42 is properly seated within housing 12 as more fully described herein. Note that when bore 30 terminates behind proximal end 26 of housing 12 and no proximal aperture 36 is present, direct driving of threaded fasteners is not possible.

Drive shaft 42 further includes worm 50, comprised of a helical rib or "thread" 52, which may be alternately fixed to shaft 42 as a separate component, or permanently integrated with the shaft during fabrication. Worm 50 is preferably, but not essentially, located proximate to the distal end of shaft 42, behind journal 46. Worm 50 preferably terminates at its distal end in annular shoulder 54 which has a plane perpendicular to the axis of rotation of shaft 42 to provide a smooth interface between shoulder 54 and the co-planar surface of journal receiving means 56 when journal 46 is seated therein (FIGS. 2 and 3). Journal receiving means 56 may be alternately comprised of a suitable bushing (shown), bearing, or bore or chamber formed within housing 12 itself, and sized to slidably receive therein journal 46. At the opposite end of shaft 42, adaptor 44 is seated within adaptor receiving means 58 which may also be comprised of a suitable bushing or bearing. In both instances (journal receiving means and adaptor receiving means), the use of bearings or bushings are preferred to facilitate rotation of journal 46 and adaptor 44 therein while limiting abrasion.

Figure 2:
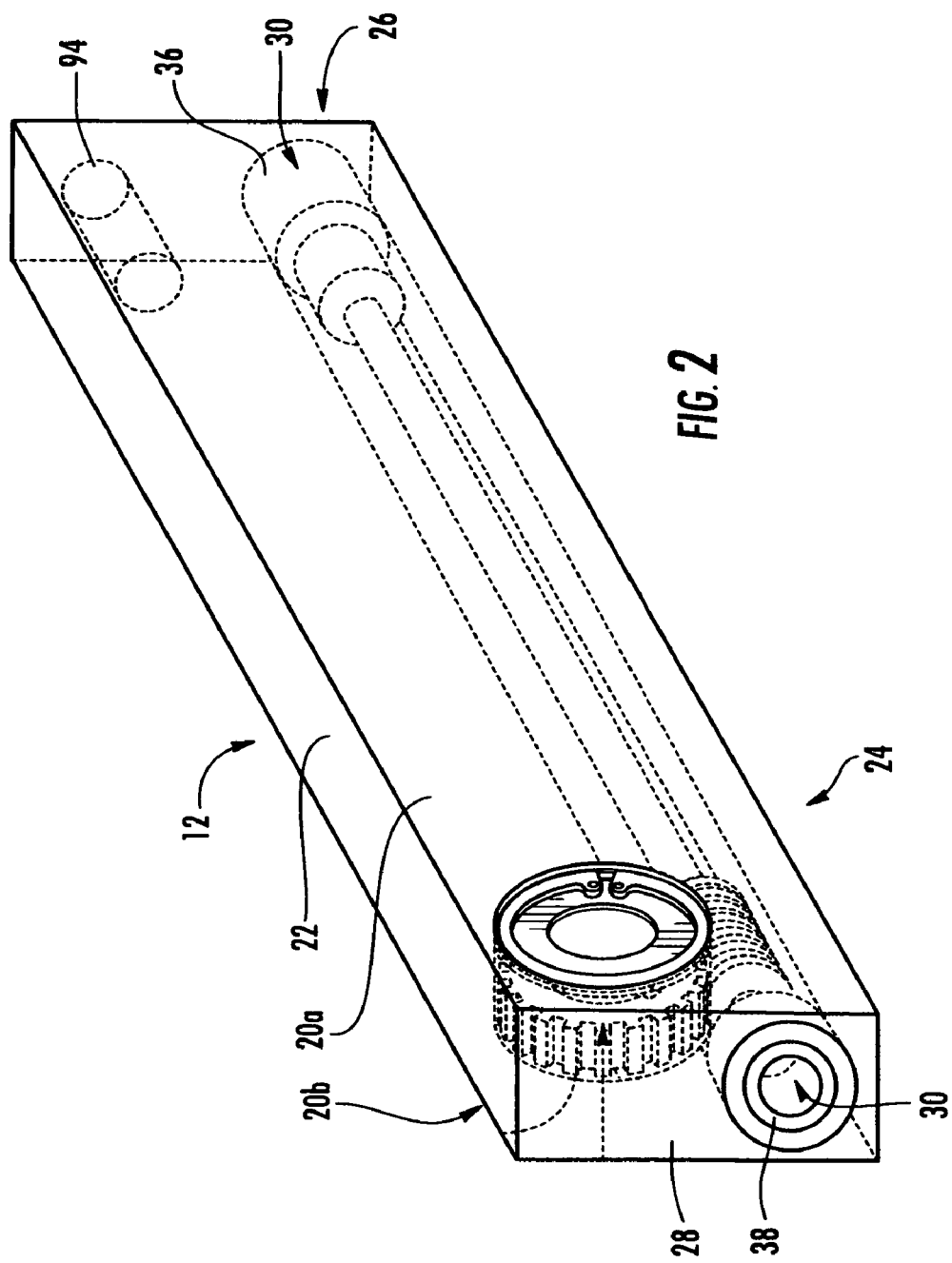
FIG. 2 is a an isometric view of the subject right angle driving apparatus as assembled, portions of which are depicted in phantom view.
Figure 3:
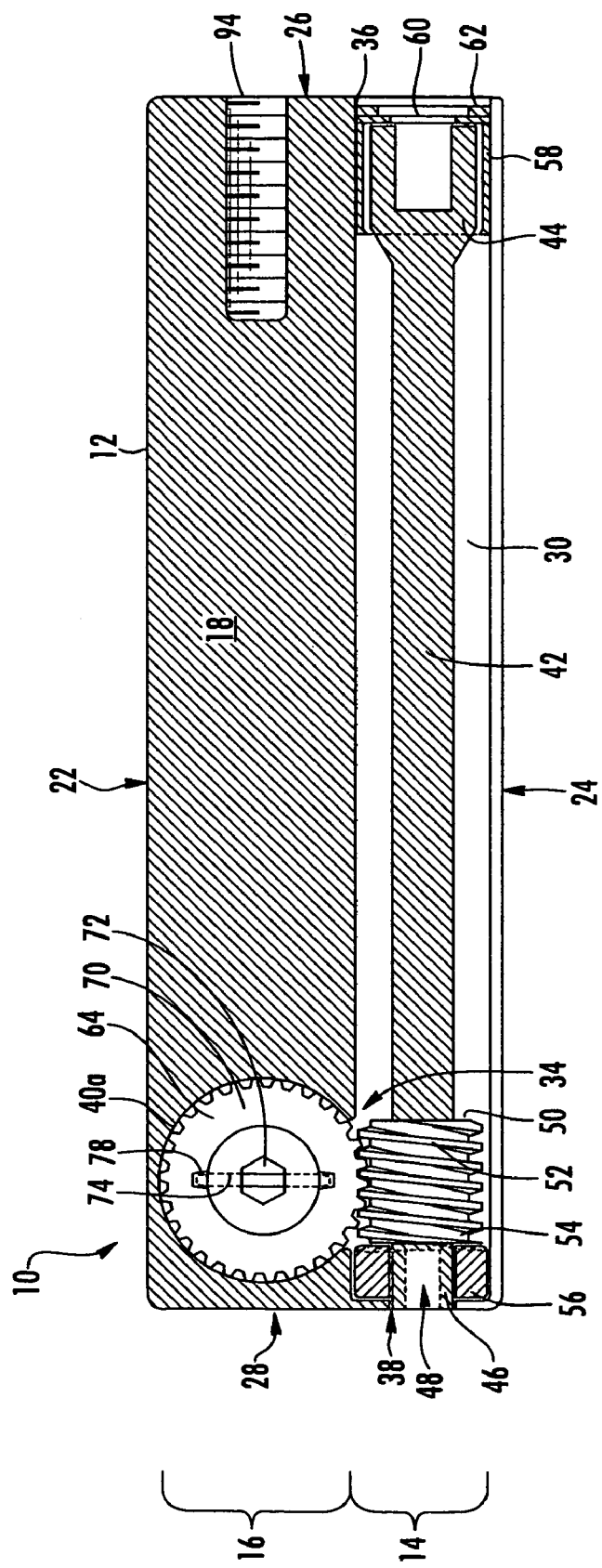
FIG. 3 is cross-sectional view of the subject right angle driving apparatus.

Referring to FIGS. 2 and 3 it may be observed that drive shaft 42 is inserted through proximal aperture 38 into axial bore 30 until journal 46 is seated within journal receiving means 56. At the proximal end 26 of housing 12, adaptor 44 is seated within adaptor receiving means 58. Annular retainer 60, in combination with internal circlip or "snap ring" 62, together retain drive shaft assembly 14 within housing 12 generally, and within axial bore 30 in particular.

Worm wheel assembly 16 is comprised of worm wheel 64 having a plurality of teeth 66 incrementally spaced about wheel 68. Worm wheel 64 is mounted over cylindrical hub 70 having axial hub bore 72 disposed there through which is polygonal in cross-section for the slidable engagement with driving tools with similarly shaped shafts in both ends. Hub 70 has a length preferably substantially equal to the length of transverse bore 32 which in turn is equal to the width of housing 12. Worm wheel 64 may be mounted onto hub 70 using conventional means including, but not limited to keyway, set screws, hub claming screws, split, and simple bore. To cause hub 70 and worm wheel 64 to rotate in unison during operation, wheel-hub locking means are employed which, in the embodiment illustrated, are comprised of hub pin 74 inserted through transverse pin hole 76 and caused to engage opposing parallel grooves 78 of wheel 68. Note that pin 74 further serves to restrict the depth of insertion of driving tools within hub bore 72. In an alternative embodiment, worm wheel 64 and hub 70 may be fixedly attached or integrated during fabrication.

Worm wheel assembly further includes a pair of ball thrust bearings 80 slidably mounted over opposite ends of hub 70 and in slidable engagement with opposite sides of worm wheel 64 (FIGS. 2 and 3). Thrust bearings 80 serve to carry axial or "thrust" loads, namely loads parallel to the axis of rotation of hub 70. Similarly, it may be desirable to employ a third thrust bearing (not shown) overjournal 46 in slidable engagement with worm shoulder 54 to carry thrust loads experienced by shaft 42 during direct driving applications.

Reference again being made to FIGS. 2 and 3, worm wheel assembly 16 is removably mounted within transverse bore 32 by first loading worm wheel 64 and thrust bearings 80 onto hub 70 as previously described and then inserting the assembly through first side aperture 40a into transverse bore 32 until the end of hub 70 and corresponding thrust bearing 80 are abutted against the interior surface 82 of second side wall 20b. Note that hub 70 has a diameter greater than the diameter of second side aperture 40b such that when inserted through first side aperture 40a and into transverse bore 32, the end of hub 70 abuts the interior surface 82 of second side wall 20b. Hub bore 72 is completely exposed by and visible through first and second side apertures 40a and 40b.

Once inserted into transverse bore 32, worm wheel assembly 16 is secured in place using second annular retainer 84 which provides a working surface against which thrust bearing 80 may be biased, and second internal circlip 86 which is pressure released into channel 88 of first side aperture 40a.

When properly inserted, thread 52 of worm 50 of drive shaft assembly 14 will mate or mesh with teeth 66 of worm wheel 64 of worm wheel assembly 16 through communication portal 34 of housing 12. Those skilled in the art will recognize that worm 50 and worm wheel 64 must have the same pitch and pressure angle in order to mesh. Other important parameters to consider include number of teeth, face width, and gear hand direction. Worm gears have a right or left hand specification, which describes the direction of tooth curve.

Materials of construction for the subject worm gear can be metal or plastic. Gears are made from a wide variety of materials with many different properties. Factors such as design life, power transmission requirements, noise and heat generation, and presence of corrosive elements contribute to optimization of gear material. Metal choices include aluminum, brass, bronze, cast iron, steel, hardened steel, and stainless steel. Plastic choices include acetal, Delrin, nylon, and polycarbonate. Ground teeth provide smoother, higher-precision tooth form. Combination gears can have plastic teeth with metal inserts.

Thusly constructed, the subject right angle driving apparatus is capable of operable attachment to a powered rotational drive device such as a drill to transmit power at high velocity ratios between shaft 42 driven by the drill to worm wheel 64 having an axis of rotation perpendicular to that of the shaft. Both the journal portion of shaft 42 and both ends of hub 70 of worm wheel assembly 16 are adapted to receive a variety of driving tools represented by screw driving tools 100a,b,c to permit both direct driving of tools and right angle driving of the same. With regard to the latter application, it should be appreciated that the subject right angle driving apparatus provides substantial speed reduction and torque multiplication in a comparatively small design package.

With further regard to said design package, it should be understood that the block-shape of housing 12 provides specific mechanical advantages over a housing that merely encases the internal components themselves. Specifically, because the subject device operates on two perpendicular non-intersecting axes of rotation, any force applied by the user's hand, for instance, laterally against drive shaft 42 to urge driving tool 100b or 100c against a threaded fastener necessarily results in rotation of worm wheel assembly 16 about the axis of rotation of the shaft as illustrated by first directional arrow 90. As may be appreciated, such rotation would not occur if both axes of rotation intersected. Moreover, any rotation of hub 70 will result in driving tools 100b and 100c coming off the axis of rotation of the fastener to which they are in contact reducing inefficiency, creating unnecessary wear on components, and in some instances causing disengagement of the driving tool from the fastener. Because of the unique shape and flat surfaces of housing 12, it is possible for the user to apply corrective force to first and second side walls 20a,b to produce a counter-rotational force about the axis of shaft 42 as illustrated by second directional arrow 92. In short, the extension of side walls 20a,b above the axis of rotation of shaft 42 provides a surface upon which hand pressure may be applied to maintain positive contact between, and proper alignment of, driving tools 100a,b and their corresponding target fasteners.

Another advantage of the block-shape of housing 12 is the ease in which the subject apparatus may be packaged in bulk quantities. Additionally, with the exception of the removable driving tools, the subject apparatus has no protruding parts which are exposed to damage or which could become hung up on objects in cramped operating environments. The subject apparatus is easy to maneuver in tight work spaces.

Finally, housing 12 of the subject right angle driving apparatus may optionally include receiving means 94 for the removable receipt of an extension rod (not shown). Receiving means 94 is preferably comprised of an open-ended threaded chamber extending from proximal end 26 of housing 12 into core 18 and parallel to axial core 30 for the engagement of a reciprocally threaded end of an extension the extension rod. When used in combination with an extension device between adaptor 44 and a drill, the subject apparatus may be used in remote and/or confined work areas where the drill itself cannot fit.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. A right angle driving apparatus comprising:
   a. An elongated block shaped housing having a predominantly solid core, a top, a bottom, a first exterior side wall, a second exterior side wall, a proximal end and a distal end;
   b. An axial bore extending at least partially through said solid core between said proximal end and said distal end;
   c. A transverse bore extending through said solid core perpendicular to and above said axial bore between said first exterior side wall and said second exterior side wall, said transverse bore being in communication with said axial bore;
   d. a shaft mounted within said axial bore; said shaft having a proximal end capable of operable attachment to a powered rotational drive device and a partially threaded distal end, said distal end being adapted to receive driving tools to permit direct driving of tools and target fasteners;
   e. a worm wheel assembly mounted within said transverse bore and in operable communication with said partially threaded distal end of said shaft; said worm wheel assembly including a hub substantially equal to the width of said housing
   and adapted for slidable engagement with a variety of driving tools;
   whereas said first exterior side wall and said second exterior side wall extend above the axis of rotation of said shaft providing surfaces against which force may be applied in coaxial alignment with the axis of rotation of said worm wheel assembly.

2. The right angle driving apparatus of claim 1, further comprising an open-ended threaded chamber extending from said proximal end of said housing into said core, said threaded chamber being parallel to said axial bore.

* * * * *